April 23, 1929. J. E. MESSENGER Re. 17,277
SHUTTER FOR AUTOMOBILE RADIATORS
Original Filed Jan. 28. 1919 2 Sheets-Sheet 1
Fig. 1.
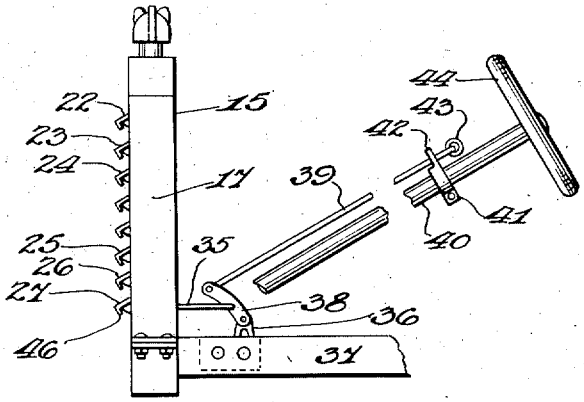
Fig. 3.
Fig. 2.
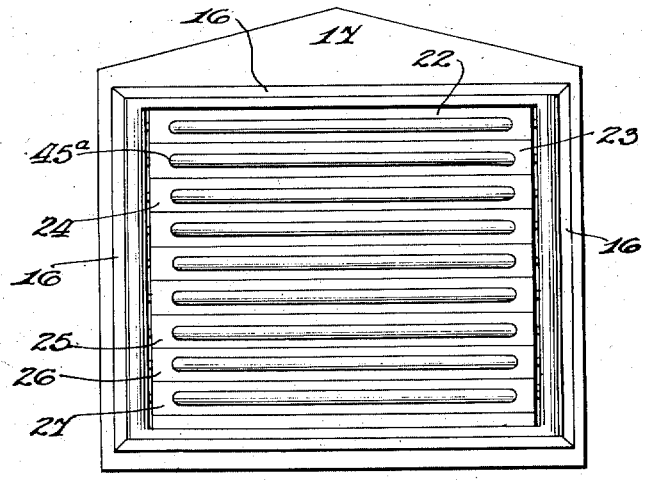
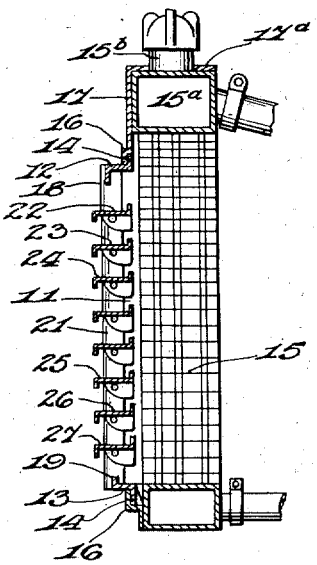
Fig. 8.
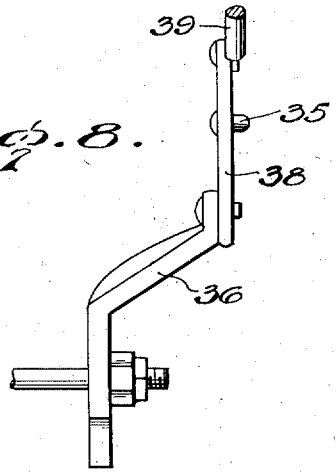
Fig. 9.
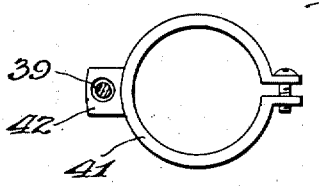
Inventor
JACK E. MESSENGER
By Attorneys
Raymond & Littell April 23, 1929. J. E. MESSENGER Re. 17,277

SHUTTER FOR AUTOMOBILE RADIATORS

Original Filed Jan. 28. 1919 2 Sheets-Sheet 2

Inventor
JACK E. MESSENGER
By Attorneys.
Raymond & Little

Reissued Apr. 23, 1929. Re. 17,277

UNITED STATES PATENT OFFICE.

JACK E. MESSENGER, OF DES MOINES, IOWA, ASSIGNOR TO WILLIAM P. HAMMOND, OF SCARSDALE, NEW YORK.

SHUTTER FOR AUTOMOBILE RADIATORS.

Original No. 1,428,647, dated September 12, 1922, Serial No. 273,635, filed January 28, 1919. Application for reissue filed October 24, 1927. Serial No. 228,433.

One object of my invention is to provide a device, including a shutter, adapted to be mounted in front of and extending across a radiator and adapted to be held at its margins by and beneath the front flanges of a radiator shell, together with means, extending within easy reach of a driver, for adjusting the shutter.

A further object of this invention is to be found in the provision of novel means for operating a shutter, said means including a compound lever and an operating rod extending within easy reach of a driver.

A further object of this invention is to be found in the provision of a shutter composed of overlapping pivoted vanes, the overlapping portions of said vanes being formed with overlapping or interlocking oppositely-extending flanges.

A further object of this invention is to be found in the provision, in a shutter formed with overlapping pivoted vanes, of laterally-extending ears on the ends of said vanes adapted to be pivoted to spaced supports located at opposite ends of the vanes, a row of said ears, in a plane adjacent to one end of the collocation of vanes, being formed with like extensions adapted to be pivoted in spaced relation to an operating bar common to all the extensions, whereby in a movement of rectilinear reciprocation of said bar all of the vanes are oscillated simultaneously.

A further object of this invention is to be found in the construction of a one piece frame for a shutter, which frame is formed with marginal flanges on one margin of each jamb, oppositely-extending marginal flanges on opposite margins of two opposed jambs and re-curved flanges similarly located on the two opposed remaining jambs, the shutter being formed with pivoted vanes, extreme marginal portions of vanes overlapping the plane inner flanges, said vanes being pivoted to the recurved inner flanges.

My invention consists in the construction, arrangement and combination of elements hereinafter set forth, pointed out in my claims and illustrated by the accompanying drawing, in which—

Figure 1 is an elevation illustrating the general arrangement of my improved devices.

Figure 2 is a front elevation showing my improved shutter device mounted in a radiator shell, in closed position, while Figure 3 is an elevation, partly in section, showing the shutter device in open position, Figures 2 and 3 being on a scale different from Figure 1.

Figure 8 is an elevation, partly in section, showing in detail portions of the vane-operating mechanism.

Figure 9 is a plan, showing, in detail, a clamp and operating rod, whereby the operating rod may be slidingly mounted on a steering column.

Figure 5:
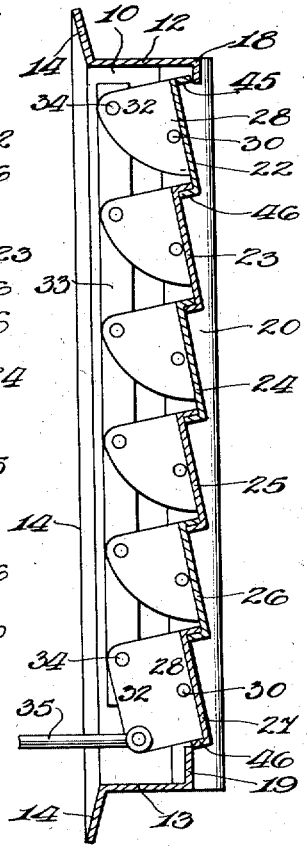
Figure 6:
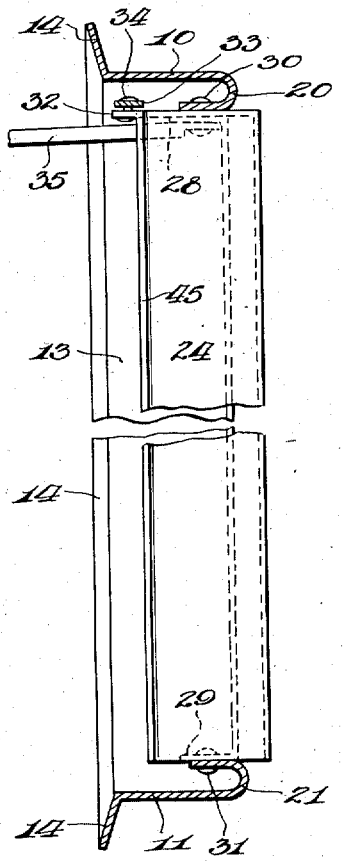
Figure 6 is a horizontal section through the shutter device only on the indicated line 6—6 of Figure 4, portions being broken away to economize space.
Figure 7:
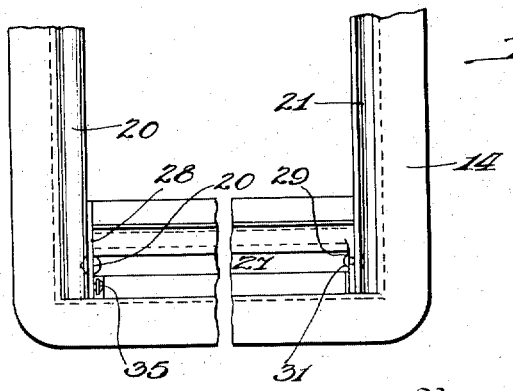
Figure 7 is a rear elevation of the shutter device only, portions being broken away to economize space.

In the construction of the apparatus as shown the numerals 10, 11 designate side jambs and 12, 13 top and bottom jambs, respectively, of a rectangular frame adapted to receive and carry a shutter device. A continuous marginal flange 14 is formed on and flared or inclined slightly from the plane common to the inner margins of the jambs 10, 11, 12, 13 and said marginal flange is adapted to be received and held between the outer surface of a radiator 15 and an outwardly-offset inner-flange portion 16 of a radiator shell 17 (Figs. 2 and 3). By this means the shutter frame is held in desired location and vertical position in front of a radiator, the radiator and shell being shown conventionally, and no bolts, screws, brackets, lugs or other securing devices need be employed. This reduces expense, tends to strengthen the structure, and reduces materially the amount of time and labor required for installing the shutter device. If desired however, the flange may be made to fit within the confines of the shell of the radiator and be secured to the radiator core by suitable bolts or the like. A plane flange 18 is formed on and extends downwardly (inwardly) from the outer margin of the head jamb 12 and a plane flange 19 is formed on and extends upwardly (inwardly) from the outer margin of the bottom jamb 13, said plane flanges 18, 19 being in different vertical planes. A recurved flange 20 is formed on and extends inwardly from the inner margin of the side jamb 10 and a similar recurved flange 21 is formed on and extends inwardly from the inner margin of the side jamb 11, the inner portions of said recurved flanges being opposed to each other, across the opening of the frame, and lying in parallel vertical planes (Fig. 6). A plurality of shutter vanes are provided and are designated by the numerals, 22 to 27 inclusive, which vanes may be of any desired quantity, in this instance six in number in Figures 4 and 5, eight in number in Figures 1 and 3, and nine in number in Figure 2. Each shutter vane is formed with ears 28, 29, which are inturned from its ends and lie in parallel planes (Fig. 6) and said ears are respectively pivoted to the inner portions of the recurved flanges 20, 21, in spaced relation, by rivets 30, 31. Extensions 32 are formed on the ears 28 and project toward the radiator 15 and all of said extensions are pivoted, in spaced relation, to an operating bar 33 by rivets 34. The operating bar 33 is located immediately to the rear of the inner margin of the recurved flange 20. The lowermost extension 32 of the series is of greater height than the others and a connecting link 35 is pivoted at one end to the lower rear corner of said extension and extends rearwardly therefrom through an interstice in and common to the radiator 15. A bracket 36 is removably and replaceably secured to a member 37 of the automobile frame and extends inwardly and upwardly therefrom (Figs. 1 and 8). A lever 38 is fulcrumed at one end on the inner upper end of the bracket 36 and the inner end of the connecting link 35 is pivoted to the central portion of said lever. A rod 39 is pivoted at one end to the upper end of the lever 38 and extends rearwardly and upwardly therefrom, along a steering column 40. A clamp collar 41 is mounted adjustably on the steering column 40 and is formed with an ear 42 having a hole through which the rod 39 is slidingly mounted, said rod terminating in a ring or loop 43 adjacent to the steering wheel 44 and within easy reach of the driver of an automobile on which my devices are mounted. Each of the shutter vanes is formed with integral oppositely-extending flanges 45, 46 on its long side margins and, when the shutter is in closed position (Figs. 2, 5 and 7) the uppermost flange 45 engages the inner surface of the flange 18, the lowermost flange 46 engages the outer surface of the flange 19 and the intermediate flanges 45 overlay and overlap on the intermediate flanges 46 (Fig. 5). The ends of the vanes are arranged in close relation with the recurved flanges 20, 21 and such arrangement, together with the overlapping and interlocking relation of the side flanges of the vanes, provides for closing the opening in the shutter frame substantially and preventing the passage of much, if any, air through the frame to and through the radiator. The vanes may be oscillated to any desired degree, to provide for the passage of much or little more air through the frame, by manipulation of the rod 39, motion given to said rod being communicated through the level 38, link 35, lowermost extension 32, bar 33, extensions 32 and ears 30 ultimately to the vanes. The friction of the connections holds the vanes in any position in which they may be placed manually. The marginal flange 14, being flaring and tightly clamped between the radiator 15 and flange 16 of the shell 17, securely holds the frame of the shutter device against accidental displacement and rattling.

It will be observed that the jamb frame, marginal flange 14, top and bottom flanges 18, 19 and recurved flanges 20, 21 are formed of a single piece of metal preferably by stamping, pressing and drawing, and such construction makes for stability, strength and economy of production.

It will be observed that each vane is made integral with its side flanges, ears and extensions, and a longitudinal strengthening rib 45ᵃ stamped through its center, all of a single piece of metal, preferably by stamping, pressing, and drawing, which makes for strength, stiffness, accuracy of duplication and economy of construction.

It is to be understood that the form of operating device here shown is illustrative of a wide variety which may be employed to suit the type of automobile on which the shutter device is used.

The arrangement of the pivot of the connecting link 35 to the lowermost extension of the series, relative to the pivots 30, 34 of said extension, provides the effect of a bell-crank lever in the operation of the operating bar 33 through reciprocation of said link.

Figure 4:
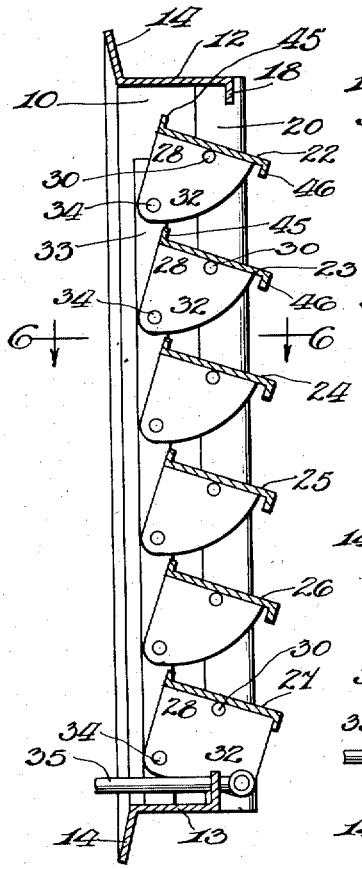
Figures 4 and 5 are vertical sections through the shutter device only on the indicated line 4—5 of Figure 2, on an enlarged scale, showing the shutter in open and closed position respectively.

When the vanes are moved to open position as shown in Figure 4, the lower end of the operating rod 33 contacts with and is stopped by the bottom jamb 13, thus limiting opening movement of the vanes and preventing the pivot of the connecting rod 35 going past center and locking. In this position of the parts the vanes slope upwardly and inwardly and the flanges 45 extend upwardly from the inner margins thereof, and the tendency is to prevent the entrance of dirt, snow, rain and other foreign substances.

Attention is called to the fact that the shutter frame is constructed to fit the radiator face of each automobile for which it is especially designed, and the opening of said frame is substantially co-extensive with the entire reticulated portion of the radiator.

Thus little of the effective cooling function of the radiator through passage of air is lost when the shutter device is in open position.

It will be understood however, that the flange 14 and opening may be located entirely within the inner margins of the shell 17 as the reduction of the cooling area is not of major importance in winter driving.

The construction of the entire frame of my shutter of one piece with the integral flared margin 14 resting against the radiator core provides an economical, rigid and non-rattling shutter, whether it is bolted to the core or held by the shell 17.

By pivoting the shutter vanes to the inner members or portions of the recurved flanges 20, 21 the pivots are concealed and protected from the elements, and protruding parts on the outer surface of the shutter frame are dispensed with.

It is to be understood that my improved shutter device is designed to be held in place solely by engagement of its side flanges by a removable shell 17 now commonly employed in the construction of automobile radiators. This shell, as shown in Figures 3 and 5, is mounted over the front portion of the radiator and is formed with a relatively large opening through which the reticulated portion of the radiator is exposed; and is formed also with marginal flanges 16 which engage the side flanges of the shutter frame and hold them against the face of the radiator. The shell 17 also is formed with a rearwardly extending flange $17^a$ at its top overlapping the upper tank $15^a$ of the radiator and having a central aperture through which the filling nozzle $15^b$ projects. To mount the shutter device on the vehicle the shell 17 is removed in the ordinary manner, the shutter frame placed in position against the face of the radiator, and then the shell is replaced with its flanges 16 contacting the flange 14 of the shutter frame. The shell is secured in place in the manner provided for it, and no additional securing members are required to hold the shutter frame in place.

I claim:

1. In an assemblage of the class described, the combination of a radiator and a shell therefor having an inner flange overlapping the margins of the radiator, and a shutter frame arranged in a plane parallel with and adjacent to said radiator and formed with a marginal flange located between and held by said radiator and inner flange, such engagement forming the only means for connecting said shutter frame to said radiator.

2. In an assemblage of the class described, the combination with a radiator and a shell therefor having a forwardly-offset inner flange in front of the radiator, of a shutter device having a marginal flange extending between and held by the radiator and shell flange, such engagement forming the sole means for securing the shutter device to said radiator.

3. In an assemblage of the class described, the combination with a radiator and a shell therefor having a forwardly-offset inner flange spaced from and in front of the radiator, of a shutter device having a marginal flange inclined rearwardly and extended between and held by the radiator and the inner shell flange, such engagement forming the sole means for securing the shutter device to said radiator.

4. The combination with a radiator having a removable and replaceable shell formed with an inwardly extending flange overlapping the margins of the radiator, of a shutter device having a frame adapted to be mounted in a plane parallel with and adjacent said radiator and formed with an outwardly extending flange adapted to be located between said radiator and the flange of said shell whereby said shutter device is held in position.

5. The combination with a radiator having a removable and replaceable shell formed with an inwardly extending flange overlapping the margins of the radiator, of a shutter device having a frame adapted to be mounted in front of said radiator and formed with an outwardly extending marginal flange adapted to be located between said radiator and the flange of said shell whereby said shutter device is held in position, the marginal flange of said shutter device being flared and inclined slightly relative to the plane of the frame thereof and adapted to be compressed and placed under tension by contact of the flange of said shell when said shutter device is in position.

6. In apparatus of the character described, a cover sheet adapted to be arranged within the shell of a radiator and having a forwardly projecting chamber, said chamber being provided with an opening, a movable shutter to control the passage of air through the opening, and means to move the shutter.

7. In apparatus of the character described, a one piece cover sheet adapted to be arranged within the shell of a radiator and having a forwardly projecting chamber, said chamber being provided with an opening, a movable shutter to control the passage of air through the opening and means to move the shutter.

8. In apparatus of the class described, a one piece cover sheet adapted to be placed adjacent to the shell of a radiator and within the confines thereof and having a forwardly projecting chamber having an opening therein of less exposed frontal area than the exposed frontal area of the radiator core, a movable shutter to control the passage of air through the opening and means to operate the shutter.

9. In apparatus of the character described, a cover sheet adapted to be arranged within the shell of a radiator and having a forwardly projecting chamber, a marginal flange on said chamber substantially parallel to and in contact with a radiator core within the frontal confines of the shell, said chamber being provided with an opening, a movable shutter to control the passage of air through the opening, and means to operate the shutter.

10. In apparatus of the character described, a one piece cover sheet having a forwardly projecting chamber, a marginal flange on said chamber substantially parallel to and in contact with a radiator core within the frontal confines of the shell, said chamber being provided with an opening, a movable shutter to control the passage of air through the opening, and means to operate the shutter.

11. In an automobile radiator shutter a one piece sheet metal frame having a marginal flange adapted to contact with the radiator core and a forwardly projecting shutter chamber provided with an opening; a movable shutter comprising a plurality of pivoted vanes to control the passage of air through said opening and means to operate the shutter.

In testimony whereof I have affixed my signature to this specification.

JACK E. MESSENGER.